(12) United States Patent
McCaffrey et al.

(10) Patent No.: US 11,008,979 B2
(45) Date of Patent: May 18, 2021

(54) PASSIVE CENTRIFUGAL BLEED VALVE SYSTEM FOR A GAS TURBINE ENGINE

(71) Applicant: United Technologies Corporation, Farmington, CT (US)

(72) Inventors: Michael G. McCaffrey, Windsor, CT (US); Tracy A. Propheter-Hinckley, Rocky Hill, CT (US)

(73) Assignee: Raytheon Technologies Corporation, Farmington, CT (US)

(*) Notice: Subject to any disclaimer, the term of this patent is extended or adjusted under 35 U.S.C. 154(b) by 35 days.

(21) Appl. No.: 16/425,016

(22) Filed: May 29, 2019

(65) Prior Publication Data

US 2020/0378343 A1  Dec. 3, 2020

(51) Int. Cl.
| | |
|---|---|
| F02M 23/00 | (2006.01) |
| F02M 23/06 | (2006.01) |
| F01D 17/20 | (2006.01) |
| F01D 5/08 | (2006.01) |
| F04D 27/02 | (2006.01) |

(52) U.S. Cl.
CPC ............ F02M 23/006 (2013.01); F01D 5/08 (2013.01); F01D 17/205 (2013.01); F02M 23/06 (2013.01); F04D 27/0215 (2013.01); F05D 2220/323 (2013.01); F05D 2240/55 (2013.01)

(58) Field of Classification Search
CPC  F02M 23/006; F02M 23/06; F05D 2220/323; F05D 2240/55; F04D 27/0215; F02C 9/18; F02C 9/52
USPC ...................................................... 415/17, 25
See application file for complete search history.

(56) References Cited

U.S. PATENT DOCUMENTS

| | | | | | |
|---|---|---|---|---|---|
| 4,271,951 | A | * | 6/1981 | Nishimura | ............... F16D 25/06 |
| | | | | | 192/106 F |
| 4,323,093 | A | * | 4/1982 | Whitney | ............. F16H 61/0283 |
| | | | | | 137/56 |
| 6,062,359 | A | * | 5/2000 | Rohs | ........................ F16H 45/02 |
| | | | | | 192/103 F |
| 9,850,774 | B2 | | 12/2017 | Vo | |
| 10,060,279 | B2 | | 8/2018 | Vo et al. | |
| 10,094,389 | B2 | | 10/2018 | Chuong et al. | |
| 10,415,412 | B2 | * | 9/2019 | Hicklin | ................. F01D 11/008 |
| 2006/0239812 | A1 | * | 10/2006 | Friedel | .................... F16K 31/56 |
| | | | | | 415/115 |
| 2012/0183398 | A1 | * | 7/2012 | Are | ........................ F04D 29/584 |
| | | | | | 416/1 |
| 2013/0064667 | A1 | * | 3/2013 | Campbell | ............. F01D 11/008 |
| | | | | | 416/193 A |

(Continued)

FOREIGN PATENT DOCUMENTS

| | | | | | |
|---|---|---|---|---|---|
| CN | 101324193 | A | * | 12/2008 | |
| CN | 107013705 | A | * | 8/2017 | ............. F01D 11/24 |

(Continued)

*Primary Examiner* — J. Todd Newton
(74) *Attorney, Agent, or Firm* — Bachman & LaPointe, P.C.

(57) ABSTRACT

A passive centrifugal valve for a gas turbine engine. The passive centrifugal valve includes an inner section with a flow control inlet orifice, a cantilevered valve adjacent to the flow control inlet orifice, and an outer section with a seal land geometry that operates to at least partially support the cantilevered valve in response to a first centrifugal force that deflects the cantilevered valve away from the flow control inlet orifice.

17 Claims, 7 Drawing Sheets

(56) References Cited

U.S. PATENT DOCUMENTS

2013/0192238 A1* 8/2013 Munsell .................... F02C 7/18
                                                    60/772
2018/0051882 A1* 2/2018 Widener ................... F02C 9/18
2018/0094531 A1* 4/2018 Hicklin ................. F01D 11/006
2018/0283177 A1* 10/2018 Bini ........................ F01K 25/10
2019/0186345 A1* 6/2019 Joyce ............... F02M 35/10157

FOREIGN PATENT DOCUMENTS

CN      107023331 A  *  8/2017  ........... G05D 23/022
DE       2746925 A1  *  4/1978  ................ F23R 3/38

* cited by examiner

PASSIVE CENTRIFUGAL BLEED VALVE SYSTEM FOR A GAS TURBINE ENGINE

BACKGROUND

The present disclosure relates to a gas turbine engine and, more particularly, to a passive centrifugal bleed valve system to control a secondary airflow circuit therein.

Gas turbine engines, such as those which power modern commercial and military aircraft, include a compressor section, combustor section and turbine section arranged longitudinally around the engine centerline so as to provide an annular gas flow path. The compressor section compresses incoming atmospheric gases that are then mixed with a combustible fuel and burned in the combustor section to produce a high energy exhaust gas stream. The turbine section extracts power from the exhaust gas stream to drive the compressor section. The exhaust gas stream produces forward thrust as it rearwardly exits the turbine section. Some engines may include a fan section, which is also driven by the turbine section, to produce bypass thrust.

During engine operation, secondary airflow is bled from one or more upstream stages of the compressor section for communication to the turbine section. In modern, highly efficient turbofan engines, the rotational velocity of the high-pressure compressor and high-pressure turbine prevents utilization of active valves in the rotational frame as such valves are unable to function due in part to centrifugal forces which create large operating loads impeding motion of the valve relative to the valve seat. In passive systems, the secondary airflow is typically metered by fixed orifices and seals which provide airflow determined by compressor pressures.

SUMMARY

A passive centrifugal valve for a gas turbine engine rotational component, according to one disclosed non-limiting embodiment of the present disclosure includes an inner section with a flow control inlet orifice; a cantilevered valve adjacent to the flow control inlet orifice; and an outer section comprising a seal land geometry that operates to at least partially support the cantilevered valve in response to a first centrifugal force that deflects the cantilevered valve away from the flow control inlet orifice.

A further embodiment of any of the foregoing embodiments of the present disclosure includes a flow control sleeve within the flow control inlet orifice, wherein the cantilevered valve seals with the flow control sleeve in response to a second centrifugal force less than the first centrifugal force.

A further embodiment of any of the foregoing embodiments of the present disclosure includes that the cantilevered valve is integral with the inner section.

A further embodiment of any of the foregoing embodiments of the present disclosure includes that the cantilevered valve is sandwiched between the inner section and the seal section.

A further embodiment of any of the foregoing embodiments of the present disclosure includes that the cantilevered valve seals the flow control inlet orifice in response to a second centrifugal force less than the first centrifugal force.

A further embodiment of any of the foregoing embodiments of the present disclosure includes that the inner section comprises a bleed passage.

A further embodiment of any of the foregoing embodiments of the present disclosure includes that the inner section is an inner portion of a shaft and the outer section is an outer portion of a shaft.

A further embodiment of any of the foregoing embodiments of the present disclosure includes that the seal land geometry is arcuate.

A gas turbine engine according to one disclosed non-limiting embodiment of the present disclosure includes a turbine section; a secondary airflow circuit in communication with the turbine section; and a passive centrifugal bleed valve system within a rotational component of the gas turbine engine operable to adapt the secondary airflow circuit to a first configuration in response to a first centrifugal force and to a second configuration in response to a second centrifugal force.

A further embodiment of any of the foregoing embodiments of the present disclosure includes that at least one valve of the passive centrifugal bleed valve system opens in response to the first centrifugal force.

A further embodiment of any of the foregoing embodiments of the present disclosure includes that at least one valve of the passive centrifugal bleed valve system closes in response to the first centrifugal force.

A further embodiment of any of the foregoing embodiments of the present disclosure includes that at least one valve of the passive centrifugal bleed valve system opens in response to the second centrifugal force.

A further embodiment of any of the foregoing embodiments of the present disclosure includes that at least one valve of the passive centrifugal bleed valve system closes in response to the second centrifugal force.

A further embodiment of any of the foregoing embodiments of the present disclosure includes that the first centrifugal force is an idle power condition.

A further embodiment of any of the foregoing embodiments of the present disclosure includes that the second centrifugal force is a takeoff power condition.

A method of adapting a secondary airflow circuit for a gas turbine engine, according to one disclosed non-limiting embodiment of the present disclosure includes passively adapting the secondary airflow circuit to a first configuration in response to a first operational condition; and passively adapting the secondary airflow circuit to a second configuration in response a second operational condition.

A further embodiment of any of the foregoing embodiments of the present disclosure includes that the first configuration comprises passively opening at least one valve in response to a first centrifugal force.

A further embodiment of any of the foregoing embodiments of the present disclosure includes that the second configuration comprises passively opening at least one valve in response to a second centrifugal force.

A further embodiment of any of the foregoing embodiments of the present disclosure includes that the first configuration comprises passively opening a diffuser air control valve.

A further embodiment of any of the foregoing embodiments of the present disclosure includes that the second configuration comprises passively opening a secondary airflow control valve.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
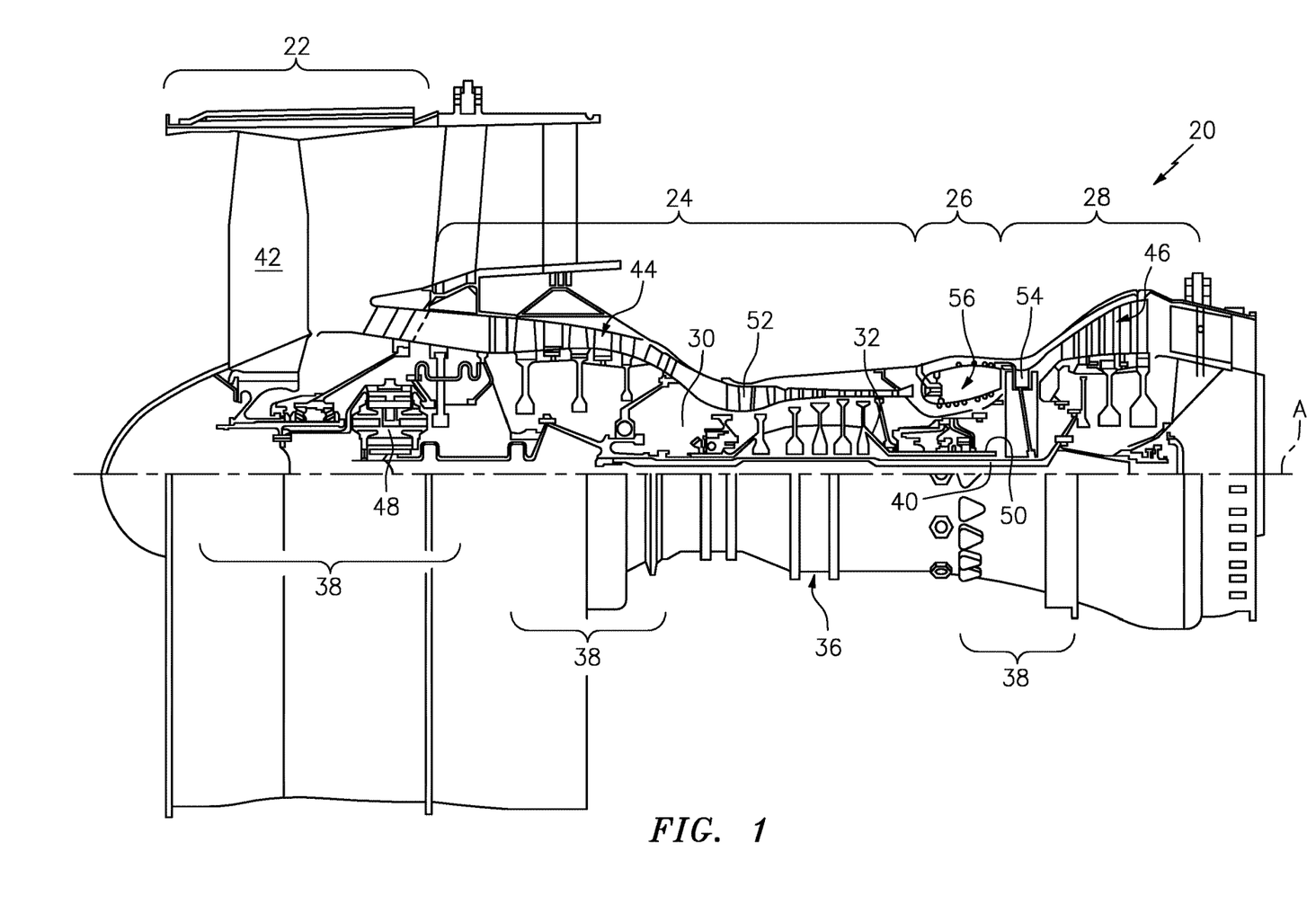
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be appreciated that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the engine case structure 36. It should be appreciated that various bearing structures 38 at various locations may alternatively or additionally be provided.

Figure 2:
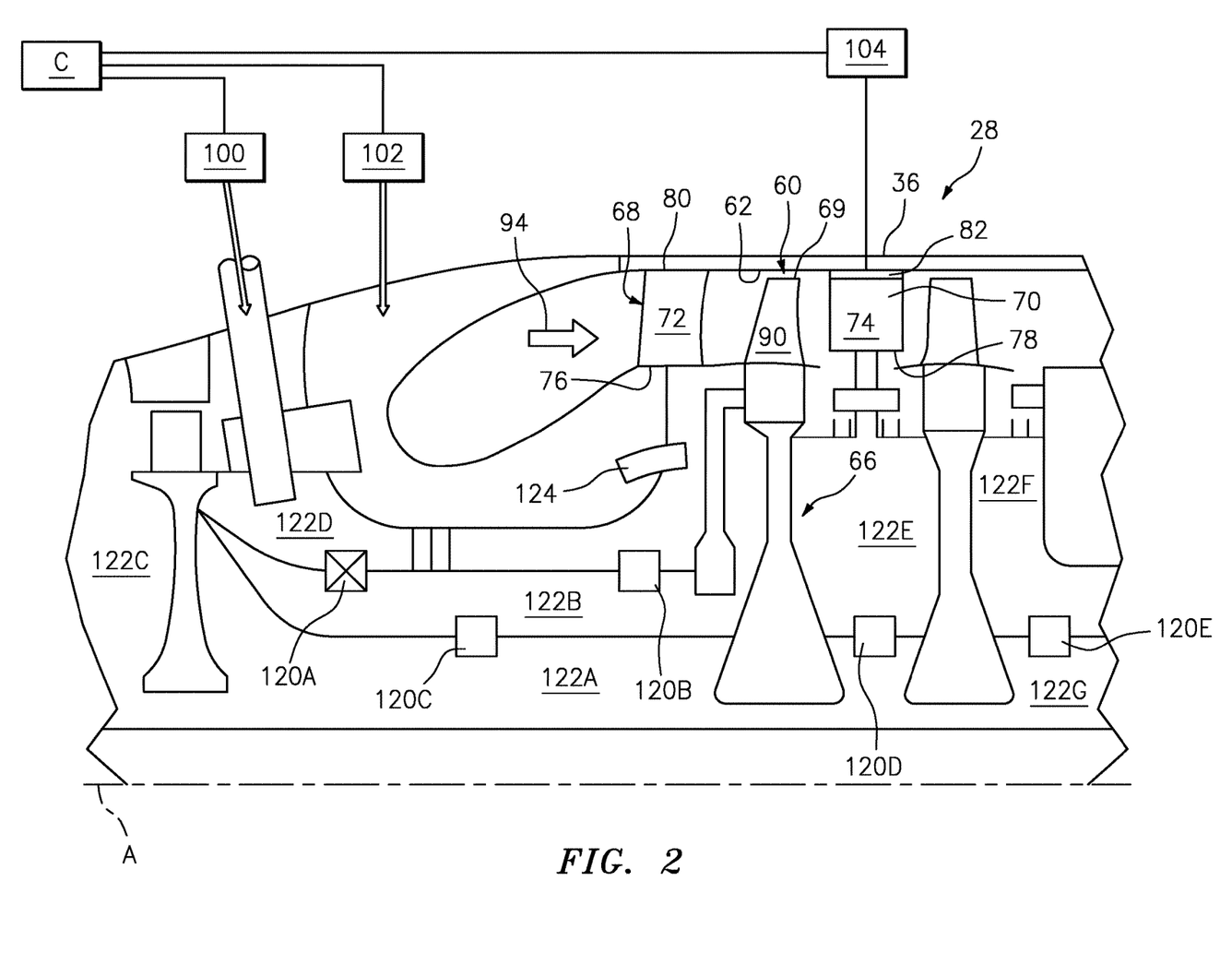
FIG. 2 is a schematic cross-section of an engine turbine section secondary airflow circuit with a passive bleed valve system.

With reference to FIG. 2, an enlarged schematic view of a portion of the turbine section 28 is shown by way of example; however, other engine sections will also benefit herefrom. A full ring shroud assembly 60 within the engine case structure 36 supports a blade outer air seal (BOAS) assembly 62. The blade outer air seal (BOAS) assembly 62 includes a multiple of circumferentially distributed BOAS 64 proximate to each rotor disk 66. The full ring shroud assembly 60 for each rotor disk 66 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The inner vane platforms 76, 78 and the outer vane platforms 80, 82 attach their respective vane ring 68, 70 to the engine case structure 36.

The blade outer air seal (BOAS) assembly 62 is affixed to the engine case structure 36 to form an annular chamber between the blade outer air seal (BOAS) assembly 62 and the engine case structure 36. The blade outer air seal (BOAS) assembly 62 bounds the working medium combustion gas flow in a primary flow path 94. The working medium combustion gas flows through the rows of vanes and blades of the turbine section. The vane rings 68, 70 align the flow of the working medium combustion gas flow while the rotor blades 90 collect the energy of the working medium combustion gas flow to drive the turbine section 28 which in turn drives the compressor section 24.

During operation of the engine, a secondary airflow "C" is often sourced from various upstream locations to provide, for example, a relatively cool air 100, a relatively hot air 102, and a mid-temperature air 104 for communication into a secondary airflow circuit 110 in the turbine section 28. The relatively cool air 100 and the mid-temperature air 104 may be bled from one or more upstream stages of the compressor section 24. The relatively hot air 102 may include HPC 52 flow from a diffuser region prior to mixing and burning with fuel in the combustor 56. This flow is referred to as T3 sourced air and is typically the highest temperature of un-combusted air. The relatively hot air 102 may also be delivered between various regions within the secondary airflow circuit 110 via, for example, an on-board injector 124 such as a tangential on-board injector (TOBI), radial on-board injector (ROBI), angled on-board injector (AOBI) or other structure.

Figure 3:
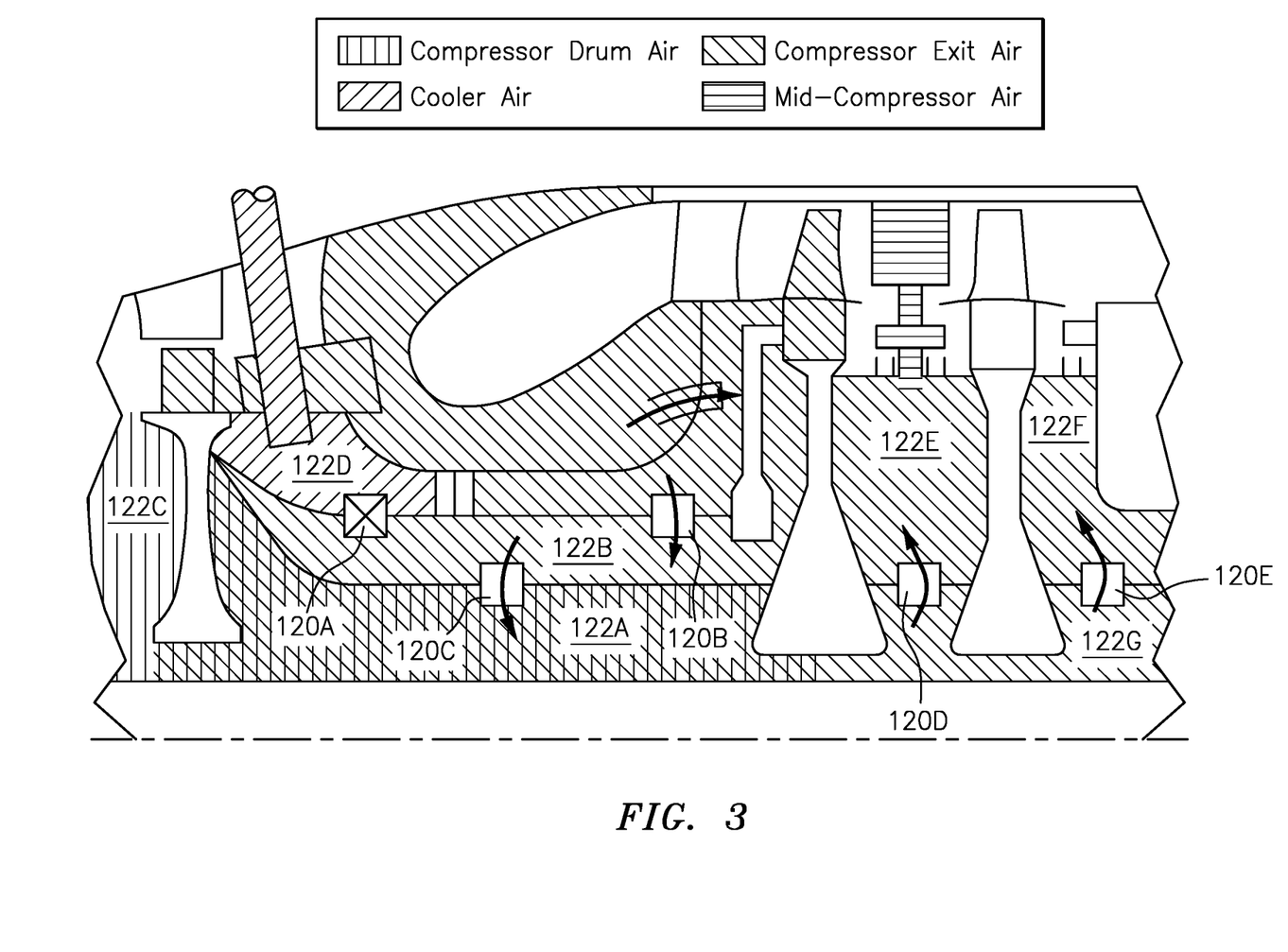
FIG. 3 is an enlarged schematic cross-section of an engine turbine section including a secondary airflow circuit with a passive centrifugal bleed valve system in a first configuration under a first centrifugal force.
Figure 4:
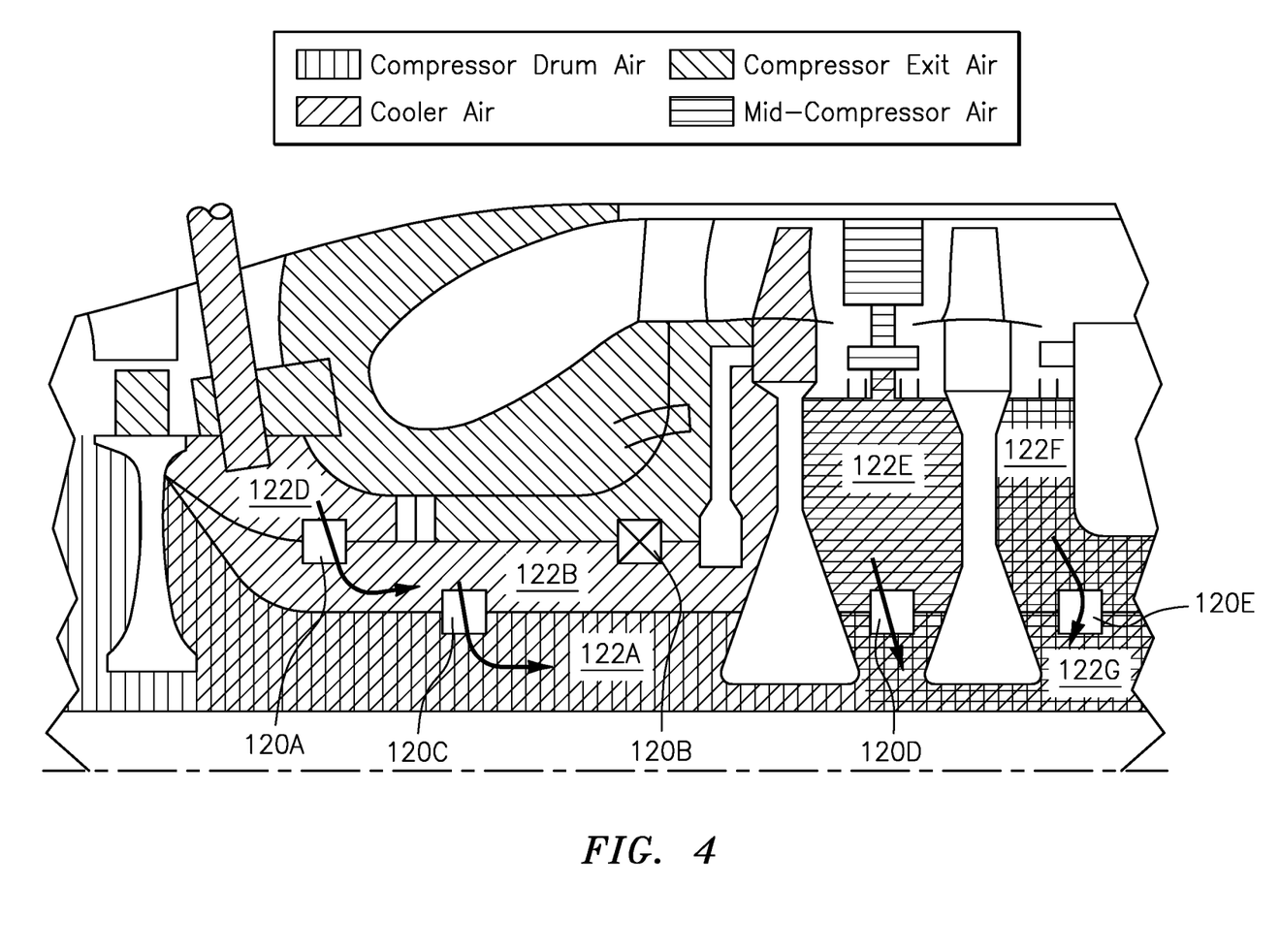
FIG. 4 is an enlarged schematic cross-section of an engine turbine section including a secondary airflow circuit with a passive centrifugal bleed valve system in a second configuration under a second centrifugal force.

A passive centrifugal bleed valve system 120 passively adapts the secondary airflow circuit 110 to distribute the relatively cool air 100, the relatively hot air 102, and the mid-temperature air 104 in response to engine operational conditions such as, for example, a first centrifugal force (e.g., idle power; FIG. 3) and a second centrifugal force (e.g., high power; FIG. 4). The passive centrifugal bleed valve system 120 minimizes the radial gradient and overall disk temperature at idle power and also avoids the possibility of overheating the rotor disks at high power because, in high compression modern turbofan engines, the T3 sourced air during high power operations can exceed the allowable metal temperature of turbine components such as the rotor disks 66.

The passive centrifugal bleed valve system 120 may include valves that switch the between the relatively cool air 100, the relatively hot air 102, and the mid-temperature air 104, and a number of throttle valves that manage the distribution within regions of the turbine section 28. The passive centrifugal bleed valve system 120 is here represented as including valves 120A, 120B, 120C, 120D, 120E, which in this example, are respectively defined as a secondary airflow control valve 120A, a diffuser air control valve 120B, a bore flow throttle control valve 120C, an interstage throttle control valve 120D, and an aft region throttle control valve 120E. Although particular valves are defined within the passive centrifugal bleed valve system 120 in particular locations, other vales in other locations may alternatively or additionally be utilized. In this example configuration, three throttle valves are defined, however in other instances, no throttle valves are required such as in a single stage turbine, or an intermediate turbine stage. In some instances, the valve will control the flow of secondary air in a manner of open or closed. In other manners of operation, the secondary flow may be increased or decreased from an initial point. In this case the valve would be considered a throttle valve. Additionally the throttle valve could operate in a manner where, due to the engine operation, the pressure difference across the valve could reverse, and the position of the valve could inhibit this pressure reversal, and hence minimize the impact on secondary flow direction. The throttle valve could also isolate the cavities preventing any flow direction change, or facilitate the increase of the secondary flow direction change.

Passively adjusting the secondary airflow circuit 110, and/or modulating the magnitudes of flow therethrough, permits the passive change of regional temperatures within the turbine section 28 such as, for example, within an inner bore region 122A, a front turbine blade cooling region 122B, a forward cooling region 122C, a diffuser region 122D, an interstage region 122E, and aft turbine region 122F, and an aft turbine bore region 122G. Although particular regions are defined within the secondary airflow circuit 110, other locations may alternatively or additionally be provided.

With reference also to FIGS. 3 and 4, in one example, the first centrifugal force (FIG. 3) passively closes the secondary airflow control valve 120A, and opens the diffuser air control valve 120B, the bore flow throttle control valve 120C, the interstage throttle control valve 120D, and the aft region throttle control valve 120E, while the second centrifugal force (FIG. 4) passively closes the diffuser air control valve 120B and opens the secondary airflow control valve 120A, the bore flow throttle control valve 120C, the interstage throttle control valve 120D, and the aft region throttle control valve 120E.

The idle rpm of the turbine section 28 is approximately half the rpm at high power operations. Since centrifugal load is a function of rotational velocity squared, the centrifugal load at idle is approximately one quarter of the load at full power. This difference in centrifugal load is rotational velocity dependent, and allows the passive centrifugal bleed valve system 120 to operate predictably at idle through high power operational conditions in response to centrifugal loads.

At idle power, T3 sourced air is the highest temperature secondary airflow and is well below the rotor disk metal temperature limits. The relatively hot air 102 may be distributed into the secondary air circuit 110 to heat the rotor disks 66 at idle power operational conditions to minimize the radial and through thickness thermal gradients between the rotor disk bore (inner diameter) and the rotor disk rim (outer diameter).

In one example for idle power operations, the passive centrifugal bleed valve system 120 opens the diffuser air control valve 120B to allow the T3 sourced air to circulate into the front turbine blade cooling region 122B while the secondary airflow control valve 120A is closed to limit the relatively cooler secondary airflow from the bleed 100 into the front turbine blade cooling region 122B. The bore flow throttle control valve 120C is open to allow the T3 sourced air to communicate with the inner bore region 122A. The interstage throttle control valve 120D and the aft region throttle control valve 120E are also opened to increase the flow of T3 sourced air, with the corresponding increase in the heat transfer coefficients to the inner bore region 122A. The magnitude of throttling of the bore flow throttle control valve 120C, the interstage throttle control valve 120D, and the aft region throttle control valve 120E may depend on the particular engine design and desired flowrates. Secondary airflow to the rotor blades 90 may also be provided since the diffuser air control valve 120B is open, and the secondary airflow can then flow to the blades through the front turbine blade cooling region 122B. In this example, the rotor disks 66 are heated at stabilized idle operational conditions in preparation for the acceleration to high power operations such that the thermal stress gradient and thermal stress range of the rotor disks 66, from idle to full power operations is minimized.

The T3 sourced air may be too hot during high power operations such that the passive centrifugal bleed valve system 120 may secondary airflow from, for example, the mid-temperature air 104 which provides a pressure and temperature less than the T3 sourced air. Alternatively, T3 sourced air can be routed through a heat exchanger, to reduce the temperature, with some corresponding loss in pressure. In one example for high power operations, the passive centrifugal bleed valve system 120 opens the secondary airflow control valve 120A, and closes the diffuser air control valve 120B such that the secondary airflow is directed towards the rotor blades 90 through the front turbine blade cooling region 122B and to the inner bore region 122A, through the bore flow throttle control valve 120C. For performance reasons, it may be beneficial to restrict the bore flow throttle control valve 120C. Additionally, the interstage throttle control valve 120D and the aft region throttle control valve 120E may also change the secondary airflow flow rates to maintain disk temperatures, air temperatures, and the pressures within the interstage region 122E, the aft turbine region 122F, and the aft turbine bore region 122G. The passive centrifugal bleed valve system 120 may also supply secondary air to the interstage region 122E, and the flow direction across the interstage throttle control valve 120D may reverse, or be completely blocked, such that no flow is directed to the interstage region 122E. In some instances, it may be desirable to throttle both the secondary airflow control valve 120A, and the diffuser air control valve 120B to manage the air temperatures and pressures within the front turbine blade cooling region 122B, and the inner bore region 122A.

Figure 5:
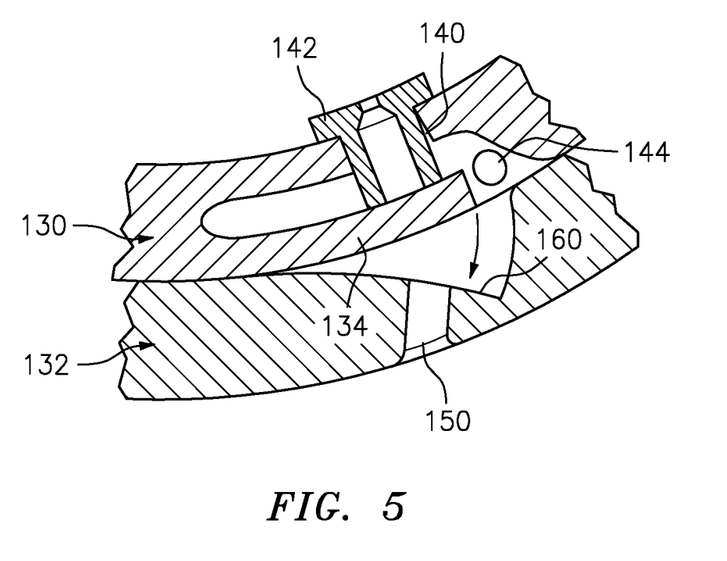
FIG. 5 is an enlarged schematic cross-section of a passive bleed valve according to one disclosed embodiment.

With reference to FIG. 5, one or more of the valves 120A, 120B, 120C, 120D, 120E may include an inner section 130, an outer section 132 and a cantilevered valve 134 therebetween. In this embodiment, the cantilevered valve 134 is integral to the inner section 130 and the inner section 130 may be an inner portion of the outer shaft 50 and the outer section 132 may be an outer portion of the outer shaft 50.

The inner section 130 includes a flow control inlet orifice 140 with a flow control sleeve 142 upon which the cantilevered valve 134 seals when in a low centrifugal force. The outer section 132 includes a flow control outlet orifice 150. A bleed port 144 may additionally be included in the inner section 130. The outer section 132 further includes an arcuate seal land geometry 160 that operates to support the cantilevered valve 134 in the high centrifugal force.

The cantilevered valve 134 forms a beam that can maintain a high power value of bending stress, regardless of the operating rotational velocity. Since a gas turbine operates over a set range of speed between idle and high power, the cantilevered valve 134 deflects a set amount at idle, and then continues to bend and deflect as the rotational velocity increases to high power. The arcuate seal land geometry 160 assures that the cantilevered valve 134 receives limited stress levels to provide a desired operational life. For example, the arcuate seal land geometry 160 can provide a constant bending stress and/or constant radius of bending may be determined along the length of the cantilevered valve 134. The arcuate seal land geometry 160 is configured so that the deflection of the cantilevered valve 134 is controlled by operating rpm, while maintaining a state of near constant bending stress in the cantilevered valve 134. The deflection of the cantilevered valve 134 selectively and passively opens and closes the flow control inlet orifice 140 to change the secondary flow system as desired. Specifically, the seal land geometry 160 is a function of the radius of the cantilevered valve 134, and an acceptable radius of curvature thereof. The curvature of the arcuate seal land geometry 160 is such that the cantilevered valve 134 can only deflect until contact, with the portion of the cantilevered valve 134 in contact increasing with increasing rpm.

Figure 6:
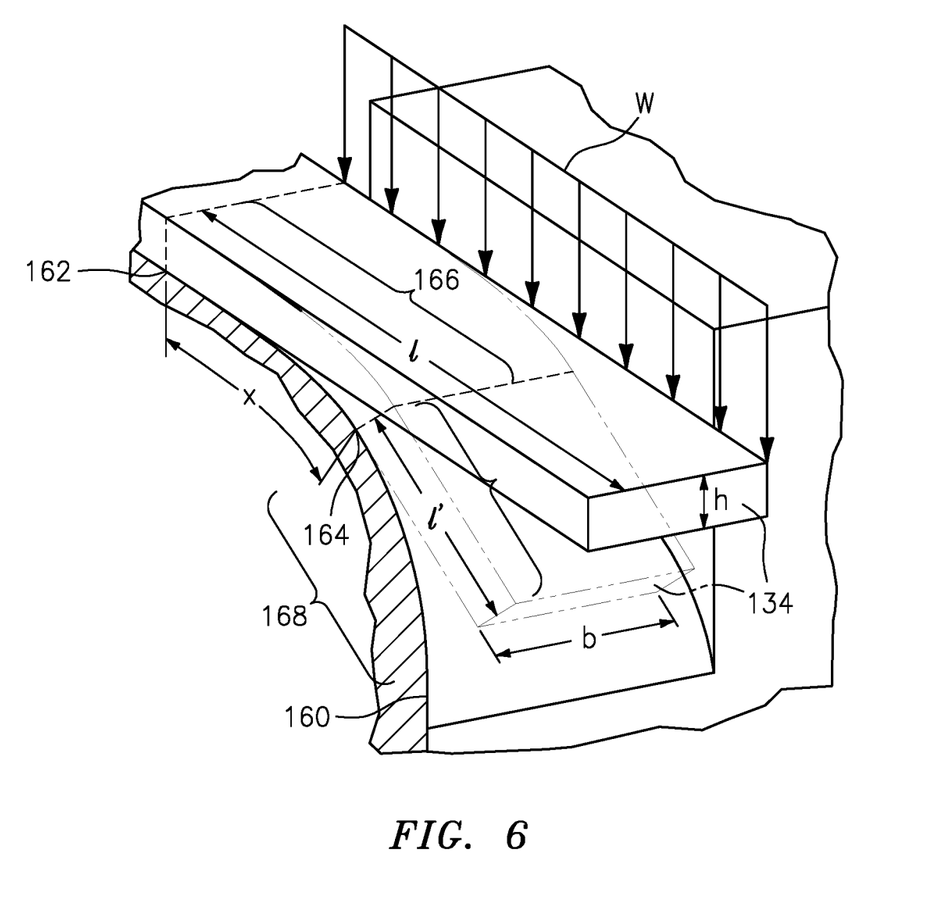
FIG. 6 is a schematic partial cross-section of a passive bleed valve of an example constant rectangular cross section.

With reference to FIG. 6, for an example cantilevered valve 134, of a constant rectangular cross section, i.e., the beam has thickness (h) and width (b), there is a minimum Radius of Curvature ($Rc_{min}$) in which the bending stress is below a temperature dependent allowable. And is defined by:

$$Rc_{min} = \frac{hE}{2\sigma_{all}}$$

Where $\sigma_{all}$ is the allowable stress, h is the beam thickness, E is Young's Modulus and $\rho$ is the density of the beam.

The nature of cantilevered beams, such as example cantilevered valve 134, is such that with a uniformly distributed load (W=wl, where l is the beam length, and w is load per unit length) the bending stress is at maximum at the constrained location. So, as the distance from the constrained location increases the bending stress decreases. In this embodiment, as the beam deflects, it contacts a rigid intermediate support, i.e., the arcuate seal land geometry 160, altering the cantilevered valves' 134 constraint location 162 to a new constraint location 164, thus further bending of the valve 134 at section 166 is not possible; hence the bending stress in the portion being supported by the arcuate seal land geometry 160 remains constant. The remaining cantilevered portion of the beam 168 is unsupported, and behaves as a cantilevered beam, with the peak bending stress at the point of contact 164 of the arcuate seal land geometry 160.

Rotation of the valve 120 causes a centrifugal force (W) on the cantilevered valve 134. For a cantilevered valve 134, in a rotating environment, the mass of the cantilevered valve 134 becomes the distributed load, this creates a moment in the cantilevered valve 134, which is at a maximum value at the end constraint 162. The maximum moment and peak bending stress can be defined as:

$$M = \left(\frac{\rho b h l^2}{2}\right)(R\omega^2) \text{ and } \sigma_b = \frac{6M}{bh^2}$$

Where R is the valves' 134 distance from the engine center of rotation A and $\omega$ is the rotational velocity of the shaft 40 or 50.

For a rectangular cross section cantilevered valve 134, the maximum bending stress ($\sigma_b$) for the remaining portion of the cantilevered valve 134, can be defined, where (x) is the distance from the original support and the edge of contact with the arcuate seal land geometry 160:

$$\sigma_x = \frac{3}{h}(l-x)^2 \rho R \omega_x^2$$

Thus the radius of curvature equation, for the minimum value of the radius of curvature for the remaining portion of the cantilevered valve 134 is:

$$Rc_x = \left[\frac{Eh^2}{6\rho R}\right]\left[\frac{1}{(l-x)^2 \omega_x^2}\right]$$

Thus for a constant allowable stress the increase in angular velocity is dependent on remaining length (l') of the cantilevered valve 134. Additionally, the local radius of curvature for the arcuate seal land geometry 160, at any given point along it's curvature, is dependent upon allowable stress and Young's Modulus.

Generally speaking, the minimum allowable radius of curvature of a given cross section tends to decrease with temperature because the material Young's modulus also decreases with temperature. For nickel superalloys, the allowable stress is fairly constant over a wide range of temperatures, until a known temperature threshold is reached where allowable stress decreases. At which point the radius of curvature begins to increase. This behavior can be used to shape the arcuate seal land geometry 160 over a wide range of operating rpm and temperatures, to insure the cantilevered valve 134 operates with a predictable deflection, and gap, enabling the manipulation of the secondary flow system 110.

The controlled arcuate seal land geometry 160 specifically controls the bending stress along the entire length of the cantilevered valve 134 to a predetermined allowable stress, while allowing significant physical motion of the cantilevered valve 134 to permit sufficient operation between idle and high power. Because the stress is managed over the length of the cantilevered valve 134 to avoid yielding or creep, the operation of the cantilevered valve 134 is highly repeatable and durable enough to enable the management of the critical secondary airflow flow over the lifetime of the engine, with high predicted reliability.

Figure 7:
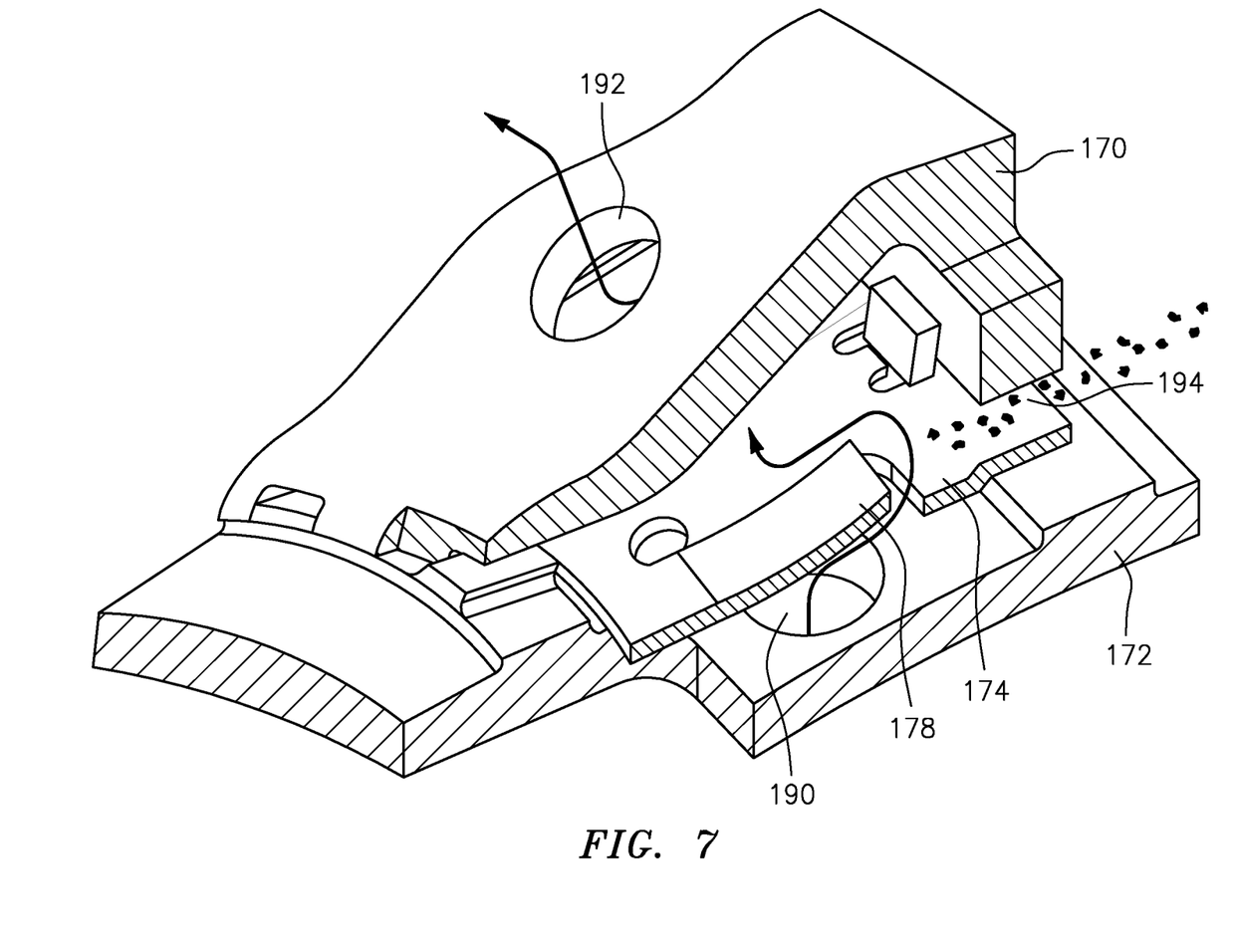
FIG. 7 is a schematic partial cross-section of a passive bleed valve according to another disclosed embodiment.

With reference to FIG. 7, in another embodiment, one or more of the valves 120A, 120B, 120C, 120D, 120E may include an outer section 170, an inner section 172 and a vane section 174 therebetween. In this embodiment, the vane section 174 may be a separate component that is sandwiched between the outer section 170 and the inner section 172

(FIG. 6). The vane section 174 may include one or more valves beams 178 (one shown) that are formed therein to selectively flex toward an arcuate seal land geometry 180 that operates to support the valve beam 178 in the high centrifugal force. That is, the vane section 174 may include a multiple of valves beams 178 defined around the engine axis A. Each cantilevered valve beam 178 selectively flexes to passively open and close a respective flow control inlet orifice 190 to change the secondary flow system 110. In response to flexing of the cantilevered valve beam 178 in response to centrifugal forces, axial secondary airflow flows through the flow control inlet orifice 190 past the articulated cantilevered valve beam 178, and through a flow control outlet orifice 192.

The secondary airflow often contains entrained particulates such as sand or other foreign object debris. As the secondary airflow is communicated from a generally axial direction at least partially around the cantilevered valve beam 178, the entrained particulates have a momentum that carries the particles downstream (FIG. 7) into a collection port 194. The particles thereby continual generally axially and avoid communication into the flow control outlet orifice 192.

The passive centrifugal bleed valve system 120 may be readily configured to switch flows between engine operating conditions with only one deflecting component within each valve and thereby operates with high reliability and repeatability to readily provide a tailored secondary air system. This minimizes the operating thermal stresses within the high rotational speeds of a modern turbofan engine to accurately and reliably control the sources of secondary airflow and the flow and pressures in the various internal cavities. The ability to form a passively tailored secondary air system, which minimizes the operating thermal stresses within the high rotational speeds of a modern turbofan engine, hinges on the ability to accurately and reliably control the sources of secondary airflow, and the flow and pressures in the various internal cavities.

The passive centrifugal bleed valve system 120 can meet the challenges of very high centrifugal loads, while operating with relatively large physical motion need for flow control, while maintaining a state of stress, which is well within the capability of the selected material. The geometry of the valve seat (land) can be replicated with high accuracy, thus creating the opportunity to control flow with high repeatability (low variation) and high reliability (safety of operation), and enabling the overall optimization and efficiency of the turbofan engine.

The passive centrifugal bleed valve system 120 operates in a predictable and reliable manner at relatively large magnitudes of centrifugal load, and at the air temperatures of modern turbofan engines enable significant changes in how turbine secondary airflow is managed within the rotating portion of the engine, and provide a significant increase to overall turbine capability. As the engine includes a multiple of rotating disks, the smallest change in overall temperature range, permits a beneficial cascading effect. Such as controlling the temperature gradient of the disk, can result in a reduction in disk mass, and a resulting reduction in the disks thermal gradient thus allowing increased life or loading of the disk.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A passive centrifugal valve for a gas turbine engine rotational component, comprising:
    an inner section with a flow control inlet orifice;
    a cantilevered valve adjacent to the flow control inlet orifice;
    an outer section comprising a seal land geometry that operates to at least partially support the cantilevered valve in response to a first centrifugal force that deflects the cantilevered valve away from the flow control inlet orifice; and
    a flow control sleeve within the flow control inlet orifice, wherein the cantilevered valve seals with the flow control sleeve in response to a second centrifugal force less than the first centrifugal force.

2. The valve as recited in claim 1, wherein the cantilevered valve is integral with the inner section.

3. The valve as recited in claim 1, wherein the cantilevered valve is sandwiched between the inner section and a seal section.

4. The valve as recited in claim 3, wherein the cantilevered valve seals the flow control inlet orifice in response to a second centrifugal force less than the first centrifugal force.

5. The valve as recited in claim 1, wherein the inner section is an inner portion of a shaft and the outer section is an outer portion of the shaft.

6. The valve as recited in claim 1, wherein the seal land geometry is arcuate.

7. A passive centrifugal valve for a gas turbine engine rotational component, comprising:
    an inner section with a flow control inlet orifice;
    a cantilevered valve adjacent to the flow control inlet orifice; and
    an outer section comprising a seal land geometry that operates to at least partially support the cantilevered valve in response to a first centrifugal force that deflects the cantilevered valve away from the flow control inlet orifice, wherein the inner section comprises a bleed passage.

8. A gas turbine engine, comprising:
    a turbine section;
    a secondary airflow circuit in communication with the turbine section; and
    a passive centrifugal bleed valve system within a rotational component of the gas turbine engine operable to adapt the secondary airflow circuit to a first configuration in response to a first centrifugal force and to a second configuration in response to a second centrifugal force, wherein the first centrifugal force is an idle power condition.

9. The gas turbine engine as recited in claim 8, wherein the passive centrifugal bleed valve system comprises at least one valve that opens in response to the first centrifugal force.

10. The gas turbine engine as recited in claim 8, wherein the passive centrifugal bleed valve system comprises at least one valve that closes in response to the first centrifugal force.

11. The gas turbine engine as recited in claim 8, wherein the passive centrifugal bleed valve system comprises at least one valve that opens in response to the second centrifugal force.

12. The gas turbine engine as recited in claim 8, wherein the passive centrifugal bleed valve system comprises at least one valve that closes in response to the second centrifugal force.

13. The gas turbine engine as recited in claim 8, wherein the second centrifugal force is a takeoff power condition.

14. A method of adapting a secondary airflow circuit for a gas turbine engine, the method comprising:
  passively adapting the secondary airflow circuit to a first configuration in response to a first operational condition, wherein the first configuration comprises passively opening a diffuser air control valve; and
  passively adapting the secondary airflow circuit to a second configuration in response a second operational condition.

15. The method as recited in claim 14, wherein the first configuration comprises passively opening at least one valve in response to a first centrifugal force.

16. The method as recited in claim 14, wherein the second configuration comprises passively opening at least one valve in response to a second centrifugal force.

17. A method of adapting a secondary airflow circuit for a gas turbine engine, the method comprising:
  passively adapting the secondary airflow circuit to a first configuration in response to a first operational condition; and
  passively adapting the secondary airflow circuit to a second configuration in response a second operational condition, wherein the second configuration comprises passively opening a secondary airflow control valve.

\* \* \* \* \*